US009895832B2

(12) United States Patent
Takatori et al.

(10) Patent No.: US 9,895,832 B2
(45) Date of Patent: Feb. 20, 2018

(54) METHOD OF MANUFACTURING PLASTIC LENS, AND METHOD FOR MANUFACTURING MOLD FOR FORMING OPTICAL LENS

(71) Applicant: HOYA CORPORATION, Tokyo (JP)

(72) Inventors: Norio Takatori, Tokyo (JP); Kiyonori Sato, Tokyo (JP)

(73) Assignee: HOYA CORPORATION, Tokyo (JP)

( * ) Notice: Subject to any disclaimer, the term of this patent is extended or adjusted under 35 U.S.C. 154(b) by 654 days.

(21) Appl. No.: 14/483,824

(22) Filed: Sep. 11, 2014

(65) Prior Publication Data

US 2014/0374932 A1 Dec. 25, 2014

Related U.S. Application Data

(63) Continuation of application No. PCT/JP2013/002120, filed on Mar. 28, 2013.

(30) Foreign Application Priority Data

Mar. 30, 2012 (JP) .................................. 2012-080547
Mar. 30, 2012 (JP) .................................. 2012-080550

(51) Int. Cl.
*B29C 45/00* (2006.01)
*B29D 11/00* (2006.01)
(Continued)

(52) U.S. Cl.
CPC .......... *B29C 45/0001* (2013.01); *B29C 45/73* (2013.01); *B29C 45/78* (2013.01);
(Continued)

(58) Field of Classification Search
CPC ..... B29C 45/0001; B29C 45/78; B29C 45/73; B29C 2945/00; B29C 45/561;
(Continued)

(56) References Cited

U.S. PATENT DOCUMENTS 2,369,758 A * 2/1945 Sheldon ........... B29D 11/00086
264/1.7
5,062,786 A 11/1991 Arai
(Continued)

FOREIGN PATENT DOCUMENTS

JP   57203529 A   12/1982
JP   02162007 A   6/1990
(Continued)

OTHER PUBLICATIONS

International Search Report for corresponding International Application No. PCT/JP2013/002120, dated Jun. 25, 2013 (2 pages).
(Continued)

*Primary Examiner* — Nahida Sultana
(74) *Attorney, Agent, or Firm* — Osha Liang LLP (57) ABSTRACT

A method for manufacturing a plastic lens that can enhance productivity by shortening the cooling time without affecting transferability even if the temperature of a mold is set low and may be applicable to an existing injection molding apparatus. When a plastic lens having a prescribed lens shape is manufactured by injecting and filling a molten resin in a cavity 3 formed between a movable mold 1 and a fixed mold 2, a molding surface of at least one of cavity forming member insert molds 11 and 12 is formed in glass substrates 11*a* and 12*a*, and for a period of time for which filling is completed with the cavity 3 being filled with a raw material resin that flows into the cavity 3, temperature control is conducted such that the surface temperature of the molding surface does not exceed the glass transition temperature of the raw material resin.

9 Claims, 8 Drawing Sheets

(51) Int. Cl.
    B29C 45/73    (2006.01)
    B29C 45/78    (2006.01)
    B29C 45/56    (2006.01)
    B29L 11/00    (2006.01)
    G02B 1/04     (2006.01)

(52) U.S. Cl.
    CPC .......... B29D 11/00 (2013.01); B29D 11/0048 (2013.01); *B29C 45/561* (2013.01); *B29C 2945/00* (2013.01); *B29L 2011/0016* (2013.01); *G02B 1/041* (2013.01)

(58) Field of Classification Search
    CPC .... B29D 11/00; B29D 11/0048; G02B 1/041; B29L 2011/0016
    USPC .................. 264/1.1, 1.7, 2.5; 425/174.4, 808
    See application file for complete search history.

(56) References Cited

U.S. PATENT DOCUMENTS

| | | | | |
|---|---|---|---|---|
| 5,549,855 A | * | 8/1996 | Nakanishi | B29C 33/3835 264/2.1 |
| 5,948,327 A | | 9/1999 | Saito et al. | |
| 2002/0038920 A1 | | 4/2002 | Tsuchiya et al. | |
| 2002/0118465 A1 | * | 8/2002 | Hosoe | B29C 33/38 359/642 |
| 2011/0233800 A1 | * | 9/2011 | Ogane | B29C 45/0055 264/2.5 |
| 2012/0081801 A1 | * | 4/2012 | Duparre | B29D 11/00375 359/811 |
| 2014/0168796 A1 | * | 6/2014 | Mori | B29C 45/1671 359/819 |
| 2016/0082629 A1 | * | 3/2016 | Modi | B29C 45/1657 264/28 |
| 2016/0356995 A1 | * | 12/2016 | Mouws | B29D 11/00307 |

FOREIGN PATENT DOCUMENTS

| | | |
|---|---|---|
| JP | 09272143 A | 10/1997 |
| JP | 11042650 A | 2/1999 |
| JP | 2001001370 A | 1/2001 |
| JP | 2002052583 A | 2/2002 |
| JP | 2005305797 A | 11/2005 |
| JP | 2011186052 A | 9/2011 |

OTHER PUBLICATIONS

Written Opinion of the International Searching Authority for corresponding International Application No. PCT/JP2013/002120, dated Jun. 25, 2013 (7 pages).

International Preliminary Report on Patentability issued in corresponding International Application No. PCT/JP2013/002120, dated Oct. 9, 2014 (9 pages).

* cited by examiner

FIG.9

METHOD OF MANUFACTURING PLASTIC LENS, AND METHOD FOR MANUFACTURING MOLD FOR FORMING OPTICAL LENS

CROSS-REFERENCE TO RELATED APPLICATIONS

This application claims the benefit of International Patent Application No. PCT/JP2013/002120, filed on Mar. 28, 2013, which is incorporated by reference in its entirety.

TECHNICAL FIELD

The present invention relates to a method for manufacturing a plastic lens, and a method for manufacturing a mold for forming an optical lens.

BACKGROUND ART

Conventionally, some plastic lenses for eyeglasses are produced by injection molding using a thermoplastic resin such as a polycarbonate resin or a methacrylic resin. Even in the case of a plastic lens having a complicated optical surface shape such as a progressive addition lens, highly accurate molding is possible by transferring the cavity shape of a mold.

For example, Patent Document 1 discloses a method for molding a plastic lens with a high degree of accuracy by controlling the temperature of a mold by heating through insertion of a high-frequency heating means into a mold in an opened state during clamping.

Further, as a method for enhancing transferability when the shape of a cavity is transferred in an injection molding method, Patent Document 2 discloses a method in which a mold is vibrated by ultrasonic waves when injecting and filling a molten resin in a cavity. Patent Document 3 discloses a method in which carbon dioxide is injected into a gap between the resin filled in the cavity and the cavity surface.

Further, as a method for molding a plastic lens for eyeglasses, a method called an injection compression molding method is known. For example, in Patent Document 4, one example of such an injection compression molding method is disclosed. According to the injection compression molding method, by further compressing a resin that has been filled by injection in the cavity of a mold, shrinkage of the molten resin is compensated, whereby uniform and higher degree of accuracy in shape can be obtained, thus leading to more accurate molding.

In the injection mold used in the injection compression molding method of the cited document 4, insert molds as a mold for forming an optical lens for molding an optical surface of a lens, that is exchangeable according to the kind of a lens, are accommodated within the inside of an insert guiding member respectively provided in a movable mold and a fixed mold, whereby a cavity for forming a lens can be formed.

The insert mold as a mold for forming an optical lens is normally made of steel such as maraging steel, beryllium-copper alloy or the like. However, for capability of molding smoother and more accurate optical surface or for other reasons, when a plastic lens is molded, use of a glass-made mold may be advantageous. Therefore, a mold for forming an optical lens obtained by connecting a glass substrate in which a molding surface for molding an optical surface of a lens is formed with a metal pedestal is known (see Patent Document 5).

RELATED ART DOCUMENT

Patent Documents

Patent Document 1: JP-A-H02-162007
Patent Document 2: JP-A-2001-1370
Patent Document 3: JP-A-2002-52583
Patent Document 4: JP-A-H09-272143
Patent Document 5: JP-A-2011-186052

SUMMARY OF THE INVENTION

Problems to be Solved by the Invention

By the way, a steel used for a mold has a significantly large thermal diffusivity relative to a resin. Therefore, when a molten resin that has been injected and filled in the cavity of a mold is brought into contact with the surface of the mold, the resin is rapidly cooled and solidified. As a result, there is a concern that if a solidified layer is formed on the surface of a molten resin, the fluidity is impaired, and as a result, transferability is lowered.

Therefore, in order to enhance the transferability in the injection molding, as in the case of the method disclosed in Patent Document 1, it is effective to control the temperature such that the temperature of a mold when injecting and filling of a molten resin becomes high.

If the temperature of a mold is increased, the solidified layer is formed slowly, the fluidity of a molten resin is kept, and as a result, transferability tends to be increased. On the other hand, there is a problem that a longer time is required for cooling until the molten resin that has been filled in the cavity is fully solidified to be taken out, whereby productivity is lowered.

Further, in the method disclosed in Patent Document 1, because it is possible to conduct heating only for a period of time during which a mold is opened, temperature control taking into consideration a temperature change from clamping to completion of filling is required, it is not actually easy to conduct such temperature control with a high degree of accuracy.

In the method disclosed in Patent Documents 2 and 3, the temperature of a mold is not elevated. However, in the method disclosed in Patent Document 2, a mold structure or an ultrasonic generating apparatus for vibrating a mold is required. In the method disclosed in Patent Document 3, a mold structure or the like is required be changed taking into consideration a channel for injecting carbon dioxide. Therefore, application is difficult only by diverting an existing injection molding apparatus, and a new equipment investment is required.

In the injection molding mold disclosed in Patent Document 4, a narrow gap is provided between an insert mold and an insert guiding member in order to allow the insert mold to be inserted easily. Such a gap is required also in order to allow the insert mold to operate smoothly when the insert mold is slidably moved in the insert guiding member. Therefore, depending on the size of the gap provided between the insert mold and the insert guiding member, the insert mold may be inclined relative to the axial direction. If such inclination is large, there is a concern that when a mold for forming an optical lens obtained by connecting a glass substrate to a metal pedestal is used as the insert mold, a corner at one end of the glass substrate may be brought into contact with the inner surface of the insert guiding member in a state as if it caves in, and at that time, cracks that cause breakage of the glass substrate may occur.

When a glass substrate is connected with a metal pedestal, in order to prevent protrusion of the glass substrate from the outer peripheral edge of the metal pedestal, connection by means of a jig can be considered. However, as long as the outer peripheral surface of the glass substrate flushes with the outer peripheral surface of the metal pedestal, the glass substrate is inevitably brought into contact with the inner peripheral surface of an insert guiding member. For these reasons, while the mold for forming an optical lens disclosed in Patent Document 2 can be applied without problems to an insert mold on the side of the fixed mold that does not move slidably, this mold cannot be applied easily, due to a high risk of breakage of the glass substrate, to an insert mold on the side of the movable mold that repeatedly moves slidably within the insert guiding member according to molding shot.

The present invention has been made taking the above-mentioned circumstances into consideration, and is aimed at providing a method for manufacturing a plastic lens that is capable of increasing productivity by shortening the time required for cooling without causing lowering in transferability, and can be easily applied to an existing injection molding apparatus. The present invention is also aimed at providing a method for manufacturing a mold for forming an optical lens obtained by connecting a metal pedestal with a glass substrate in which a molding surface for molding an optical surface of a lens is formed and is suitable for implementing the method for manufacturing this plastic lens, wherein breakage of the glass substrate in use can be effectively prevented.

Means for Solving the Problems

The method for manufacturing a plastic lens according to the present invention is a method in which a molten raw material resin is injected and filled in a cavity between a pair of halved molds, thereby forming a plastic lens having a prescribed lens shape, wherein in at least one of molds of the pair of halved molds, the molding surface for forming the cavity is formed of a heat-insulating material made of a glass material, and for a period of time from start of flowing of the raw material resin into the cavity to completion of filling with the cavity being filled with the raw material resin, the temperature control is conducted such that the surface temperature of the molding surface does not exceed the glass transition temperature of the raw material resin.

The method for manufacturing a mold for forming an optical lens according to the present invention is a method for manufacturing a mold for forming an optical lens that is obtained by connecting a glass substrate in which a molding surface for molding a plastic lens having a prescribed lens shape is formed with a metal pedestal, comprising:

forming the glass substrate to have a radius smaller than that of the pedestal;

arranging an assembly jig on the outer peripheral surface of the pedestal such that it is in close contact therewith; and stacking the glass substrate on the pedestal and connecting them with a filling material that is formed to have a thickness corresponding to the difference in radius between the glass substrate and the pedestal being disposed between the assembly jig and the glass substrate.

Advantageous Effects of the Invention

According to the method for manufacturing a mold for forming an optical lens, productivity can be increased by shortening the molding cycle while avoiding adverse effects exerted on transferability.

Further, according to the method for manufacturing a mold for forming an optical lens, when molding a plastic lens by using a mold for forming an optical lens obtained by connecting with a metal pedestal a glass substrate in which a molding surface for molding an optical surface of a lens is formed, breakage of the glass substrate can be effectively prevented.

MODE FOR CARRYING OUT THE INVENTION

Hereinbelow, the embodiment of the present invention will be explained with reference to the drawings.

[Injection Molding Apparatus]

Figure 1:
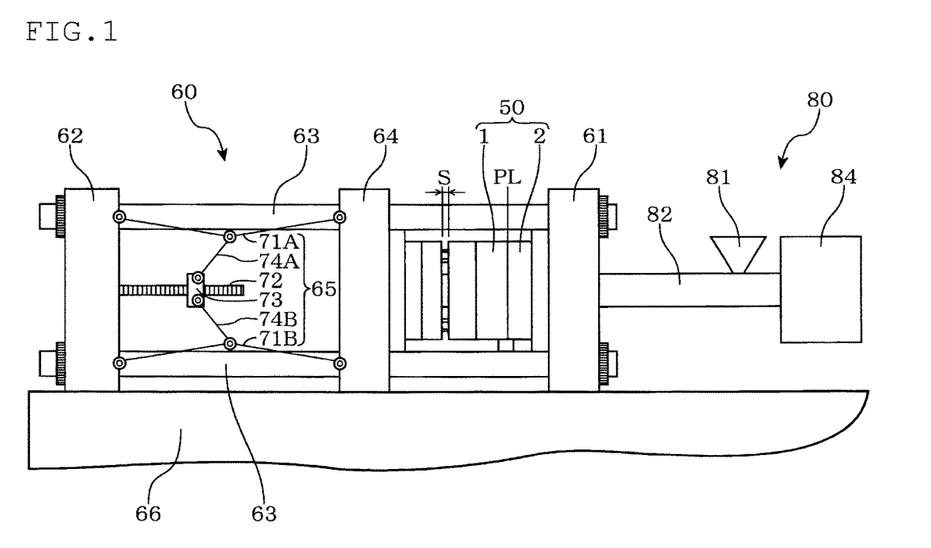
FIG. 1 is an explanatory view showing one example of an injection molding apparatus.

FIG. 1 is an explanatory view showing one example of an injection molding apparatus. The method for manufacturing a plastic lens according to this embodiment can be implemented by appropriately using such injection molding apparatus.

The injection molding apparatus shown in FIG. 1 is provided with a mold 50 having, as a pair of halved molds, a movable mold 1 and a fixed mold 2 divided by a parting line PL, a mold clamping apparatus 60 which opens and closes and clamps the mold 50 by a toggle linking mechanism 65, and an injection apparatus 80 which plasticizes, kneads and weighs the raw material resin input from a hopper 81 by means of a heating cylinder 82 and injects the resin from a nozzle 85.

[Injection Apparatus]

The injection apparatus 80 provided in the injection molding apparatus shown in FIG. 1 has a heating cylinder 82 in which a nozzle 85 is formed at the front end thereof. Inside the heating cylinder 82, a screw of which the rotation and advance/retreat movements have been controlled by a driving part 84 is arranged.

On the base end side of the heating cylinder 82, a hopper 81 for inputting a pellet-like raw material resin to the heating cylinder 82 is connected. The raw material resin input from the hopper 81 to the heating cylinder 82 is, while being sheared and pulverized by a screw rotating in the heating cylinder 82 and being molten and kneaded by the shear heat and heat from a heater provided in the heating cylinder 82, sent to a cylinder front chamber formed between the front end of the screw and a nozzle 85, and weighed. Thereafter, a prescribed amount of the raw material resin that is in the molten state of which the viscosity has been adjusted to a level suitable for injection molding is injected from the nozzle 85.

[Clamping Apparatus]

In the injection molding apparatus shown in FIG. 1, in the clamping apparatus 60, between a fixed die plate 61 and a rear plate 62 that are vertically arranged on a stand 66 with a prescribed interval, a plurality of tie bars 63 are disposed, so that a movable die plate 64 can be moved with the guide of the tie bars 63. Between the fixed die plate 61 and the movable die plate 64, the mold 50 is attached, and between the rear plate 62 and the movable die plate 64, a toggle linking mechanism 65 is attached.

Due to such a configuration, when the toggle linking mechanism 65 is driven, the movable die plate 64 is advanced or retreated by the guidance of the tie bars 63, and with this advance/retreat movement, the opening and closing and clamping of the mold 50 are conducted.

Here, in the toggle linking mechanism 65, with the rotation of a ball screw 72 which is connected to a motor (not shown), a crosshead 73 which is screwed moves along a ball screw 72. When the crosshead 73 moves towards the movable die plate 64, by connection links 74A, 74B, the toggle links 71A, 71B extend linearly, whereby the movable die plate 64 moves (advances) such that it closes to the fixed die plate 61. On the contrary, when the crosshead 73 moves towards the rear plate 62 by connection links 74A, 74B, the toggle links 71A and 71B are bent inwardly by the connection links 74A, 74B, whereby the movable die plate 64 moves (retracts) such that it is away from the fixed die plate 61.

[Mold]

Figure 2:
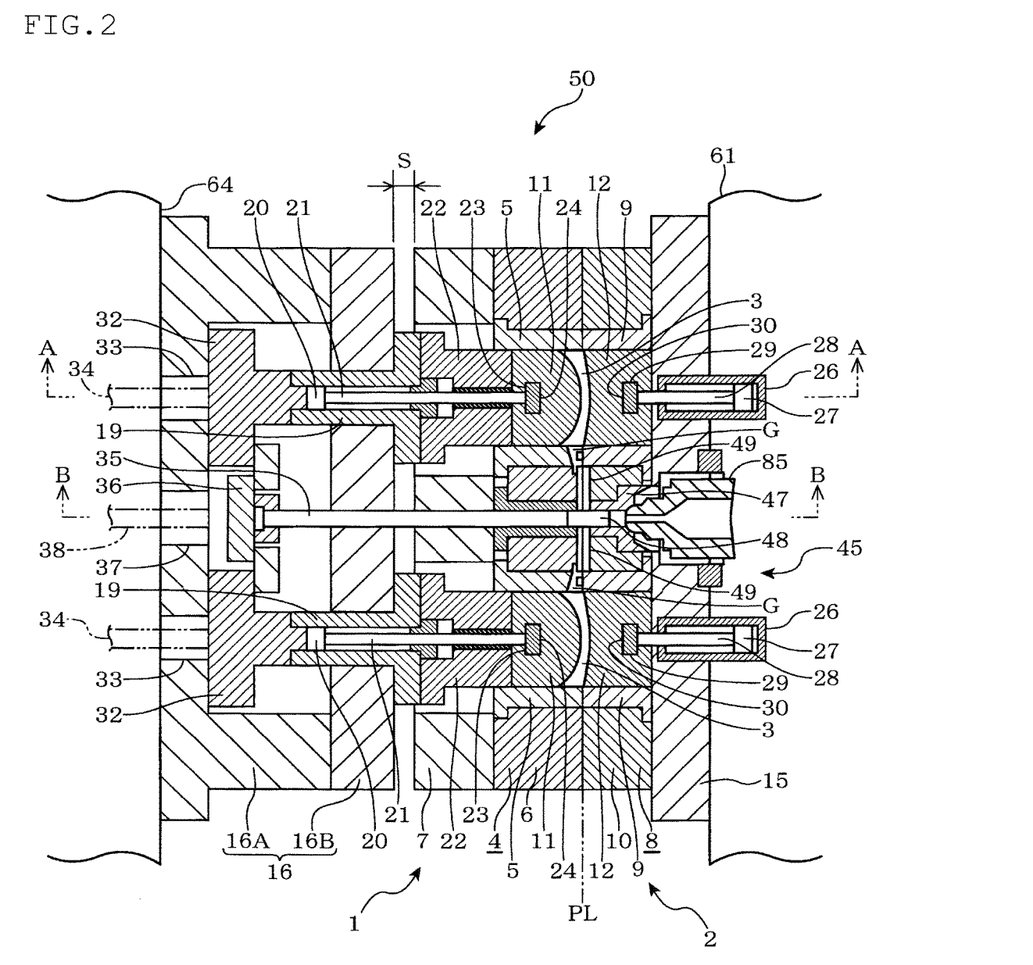
FIG. 2 is a cross-sectional view showing an outline of a mold provided in the injection molding apparatus shown in FIG. 1.
Figure 3:
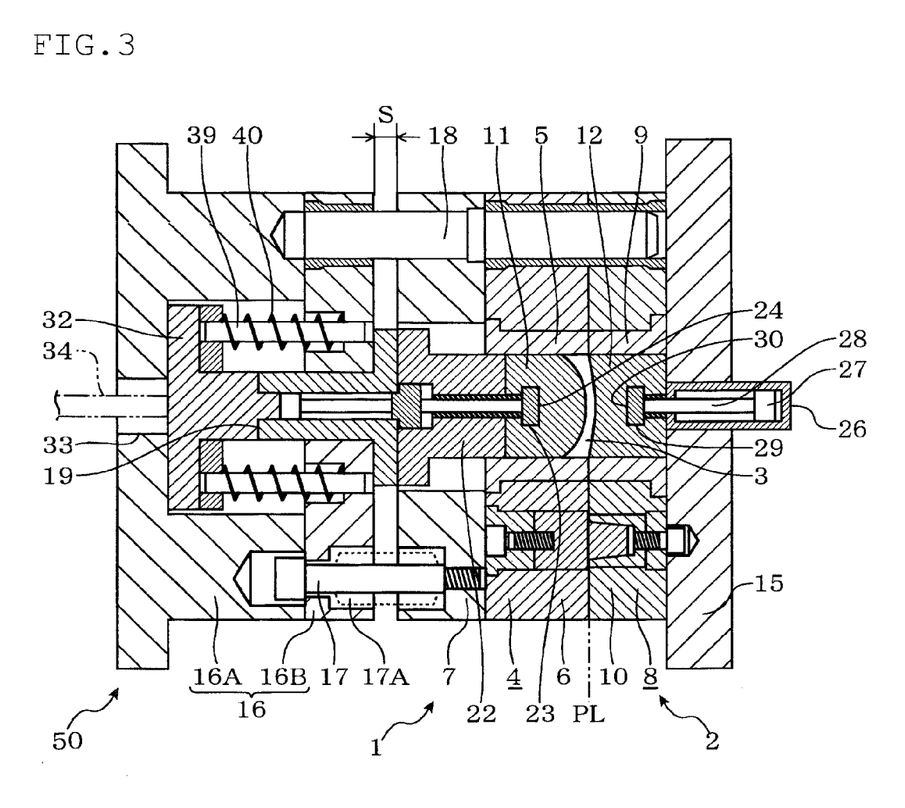
FIG. 3 is a cross-sectional view taken along the line A-A in FIG. 2.
Figure 4:
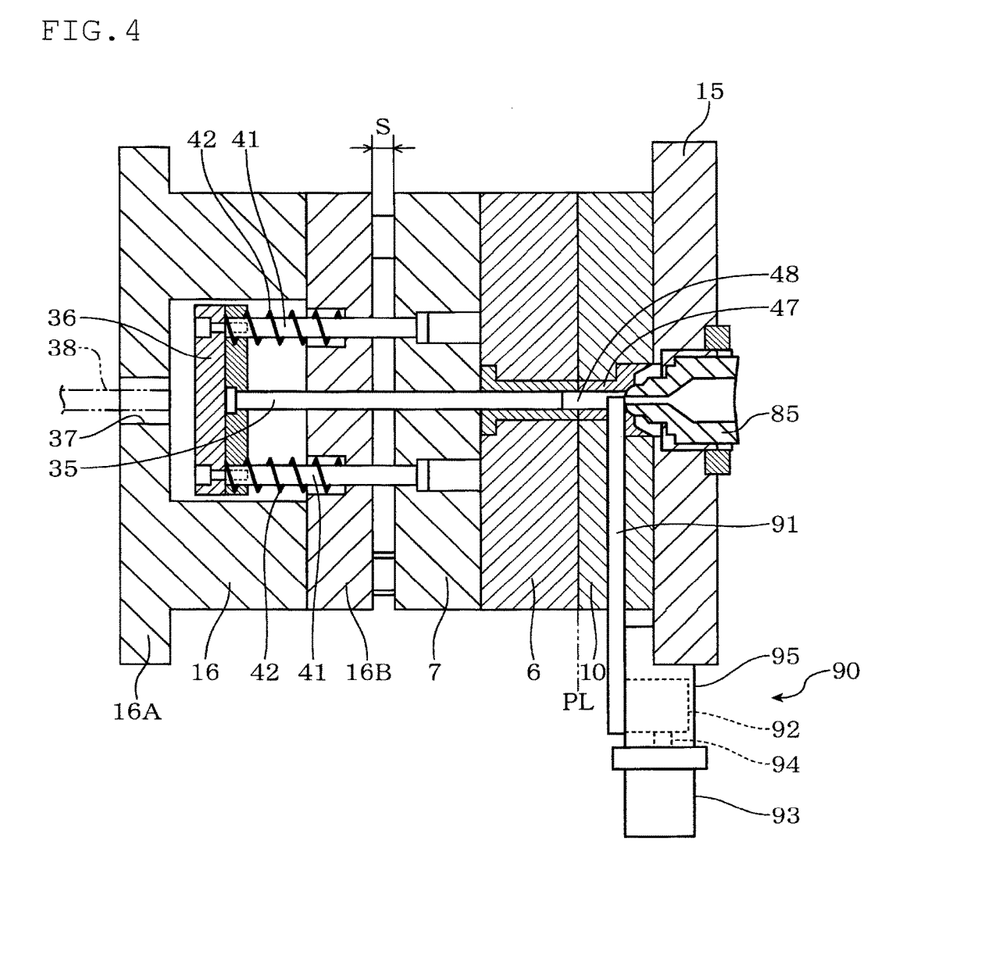
FIG. 4 is a cross-sectional view taken along the line B-B in FIG. 2.
Figure 5:
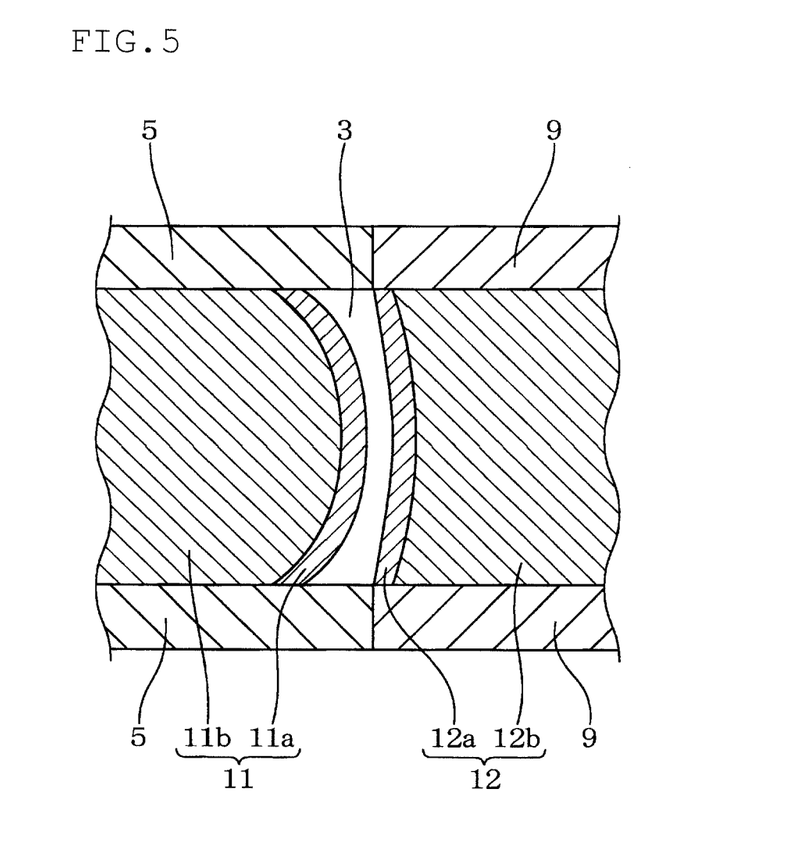
FIG. 5 is an enlarged cross-sectional view of essential parts showing the periphery of the cavity shown in FIG. 3.

FIG. 2 is a cross-sectional view of the mold 50 shown in FIG. 1, which is taken along a plane that is vertical to a sheet and passes the central axis of the mold 50. It shows the initial state in which the mold is closed. FIG. 3 is a cross-sectional view obtained by taking along the line A-A in FIG. 2, FIG. 4 is a cross-sectional view obtained by taking along the line B-B in FIG. 2 and FIG. 5 is an enlarged cross-sectional view of essential parts showing the periphery of the cavity 3 in FIG. 3.

In the examples shown in these figures, between the movable mold 1 and the fixed mold 2 that are provided in the mold 50 as a pair of halved mold, two cavities 3 for molding a plastic lens having a prescribed shape, and a runner 49, as a passage for the resin, which is connected to the cavities 3 through the gate G, is formed. On the mold plate 10 of the fixed mold 2, a sprue bush 47 forming a sprue 48 which is connected to the runner 49 at the right angle is installed.

The mold main body 4 of the movable mold 1 is provided with two insert guide members 5 and a mold plate 6 and a mold plate 7 supporting them. Inside the insert guide members 5, an insert mold 11 as the cavity forming member is accommodated such that it can be moved slidably in a direction perpendicular to the parting line PL.

The mold main body 8 of the fixed mold 2 has two insert guiding members 9 and the mold plate 10. The insert guiding member 9 is supported by the mold plate 10 and a mold-attaching member 15. Inside of the insert guiding members 9, an insert mold 12 as a cavity-forming member is accommodated such that it can move slidably in an orthogonal direction to the parting line PL.

The insert guiding members 5, 9, the inserting molds 11, 12 and the mold plates 6, 10 are provided with a circulation mechanism in which a temperature-controlling liquid supplied from a mold temperature-controlling apparatus (not shown) is circulated.

In the mold 50 having the movable mold 1 and the fixed mold 2 mentioned above, between the movable mold 1 and the fixed mold 2, a cavity 3 including a molding surface formed in each of the insert mold 11 on the side of the movable mold 1 and the insert mold 12 on the side of the fixed mold 2 is formed. The cavity 3 is formed corresponding to the shape of a plastic lens to be molded, and the molding surface of each of the insert molds 11, 12 forming the cavity 3 is formed of heat-insulating materials 11a, 12a made of a glass material.

More specifically, in the insert mold 11 on the side of the movable mold 1, a molding surface corresponding to one of the optical surfaces of a plastic lens to be molded (in the example shown in the figure, the surface on the concave side) is formed in the glass substrate 11a as a heat-insulating material that is made of a glass material. By connecting the glass substrate 11a with an insert main body 11b as a pedestal, the insert mold 11 is formed. Similarly, in the case of the insert mold 12 on the side of the fixed mold 2, the molding surface corresponding to another optical surface of a plastic lens to be molded (in the example shown in the figure, the surface on the convex side) is formed on the glass substrate 12a that is made of a glass material and serves as a heat-insulating material. By connecting the glass substrate 12a with an insert main body 12b as a pedestal, the insert mold 12 is formed (see FIG. 5).

In this embodiment, the insert molds 11 and 12 as the mold for forming an optical lens are manufactured by the following procedures.

Since the insert mold 11 on the side of the movable mold 1 and the insert mold 12 on the side of the fixed mold 2 can be manufactured by the same method, in the example explained below, an explanation is made on only a case in which the insert mold 11 on the side of the movable mold 1 is manufactured.

Figure 6:
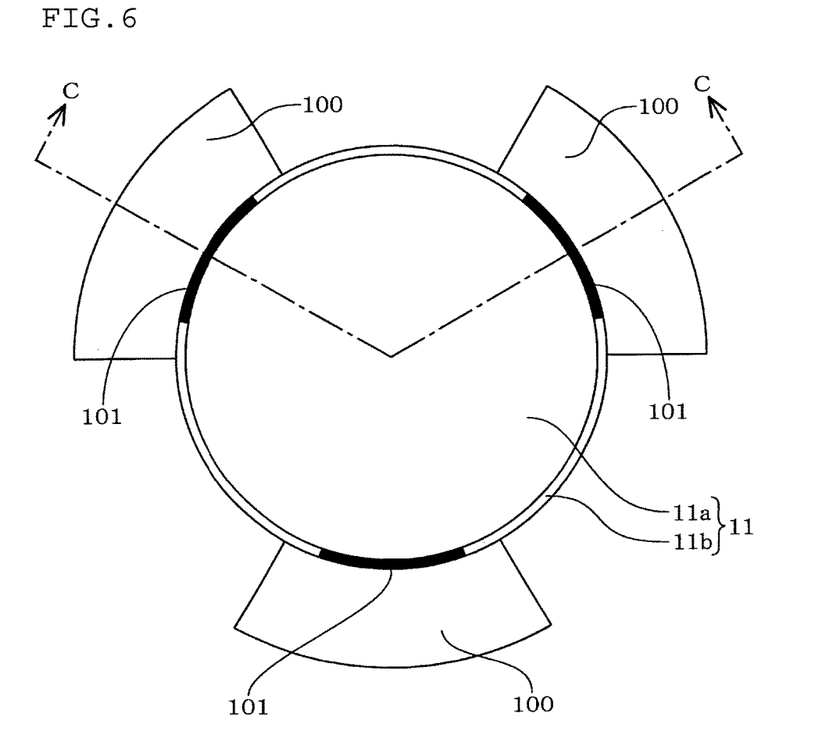
FIG. 6 is an explanatory view for explaining one example of the method for manufacturing a mold for forming an optical lens according to the embodiment of the present invention.
Figure 7:
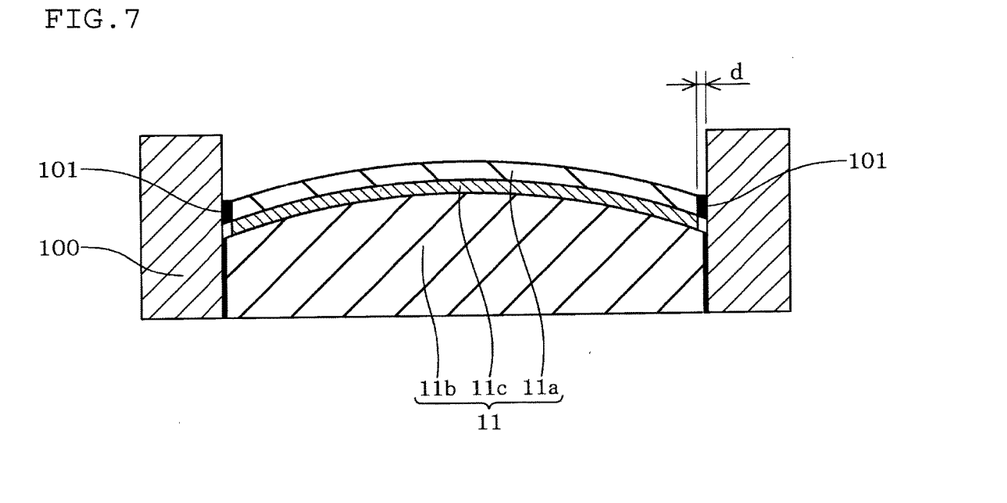
FIG. 7 is a cross-sectional view taken along the line C-C in FIG. 6.

FIG. 6 is an explanatory view for explaining one example of the method for manufacturing a mold for forming an optical lens according to the embodiment of the present invention. FIG. 7 is a cross-sectional view taken along the line C-C in FIG. 6.

As shown in these figures, in the method for manufacturing the mold for forming an optical lens according to this embodiment, first, when the glass substrate 11a is connected to the insert main body 11b, for positioning, on the peripheral surface of the insert main body 11b, an assembly jig 100 is provided such that it is in close contact therewith.

In the shown example, three assembly jigs 100 are provided on the outer peripheral surface of the insert main body 11b at an equal interval. In order to minimize occurrence of position aberration of the glass substrate 11a and the insert main body 11b, it is preferable to provide three or more of assembly jigs 100. Alternatively, the assembly jig 100 may be a ring-like member that surrounds the entire periphery of the insert main body 11b.

It is preferred that each assembly jig 110 be processed accurately such that it can be closely adhered to the outer peripheral surface of the insert main body 11b with no gap being formed between the jig and the insert main body 11b.

Subsequently, an adhesive is applied to one or both connection surfaces of the glass substrate 11a and the insert main body 11b, the connection surfaces of them are overlapped one on another. At this time, the radius of the glass substrate 11a is rendered slightly smaller than the radius of the insert main body 11b. A metal tape 101 as a filling material that is formed in a thickness equal to a difference in radius "d" (a difference between the radius of the glass substrate 11a and the radius of the insert main body 11b) is disposed between the glass substrate 11a and the assembly jig 100. In that state, the glass substrate 11a is stacked on the insert main body 11b and connected.

It is preferred that the filling material be formed of a metal material such that the thickness thereof is not changed by the pressing force when it is disposed between the glass substrate 11a and the assembly jig 100. It is preferable to use a metal tape 101 made of stainless steel or the like. Further, when disposing the metal tape 101 between the glass substrate 11a and the assembly jig 100, it is preferred that the metal tape 101 be attached to one of the glass substrate 11a and the assembly jig 100.

Then, by removing the jig 100 and the metal tape 101, the insert mold 11 in which the glass substrate 11a and the insert body 11b are connected through an adhesive layer 11c is obtained. In the insert mold 11 manufactured in this way, the outer peripheral surface of the glass substrate 11a is located inside of the outer peripheral surface of the insert main body 11b at a fixed interval d along the circumferential direction.

Due to such a configuration, when the insert molds 11, 12 move slidably inside the insert guiding members 5, 9, even if the insert molds 11 and 12 are inclined relative to the axial direction, contact of the outer peripheral surfaces of the glass substrates 11a, 12a with the inner peripheral surfaces of the insert guiding members 5, 9 can be effectively prevented.

The difference in radius of the glass substrates 11a, 12a and radius of the insert main bodies 11b, 12b is 5 to 50 µm, for example, preferably 15 to 25 µm. If the difference "d" is smaller than the above-mentioned range, the outer peripheral surface of the glass substrates 11a, 12a are almost flushed with the outer peripheral surface of the insert main bodies 11b, 12b. As a result, contact of the glass substrates 11a, 12a and the inner peripheral surfaces of the insert guiding members 5, 9 cannot be prevented easily. On the other hand, a difference "d" exceeding the above-mentioned range is not preferable, since the molten resin that has been filled in the cavity 3 enters a gap formed between the inner peripheral surfaces of the glass substrates 11a, 12a and the inner peripheral surfaces of the insert guiding members 5, 9. As a result, unfavorable burrs tend to be generated easily in the molded plastics.

As the glass substrates 11a, 12a that form the molding surface of each of the insert molds 11, 12 thus manufactured, an amorphous glass material such as a Crown-based, flint-based, barium-based, phosphate-based and fluorophosphates-based glass material can be used, for example. Among these, it is preferable to appropriately select and use an amorphous glass material having a thermal conductivity of 0.4 to 1.3 W/m·K. In the case of such an amorphous glass material, mirror-finished properties on the surface can be easily obtained by cutting or polishing. Therefore, it is suited to form a molded surface that requires a high degree of accuracy, and hence, can be preferably used in the present invention as a heat-insulating material having excellent molding properties.

That is, while a sophisticated technology and troublesome processes are required to directly form a molding surface on an insert mold made of a steel material that has been polished, by forming the insert molds 11, 12 by connecting the glass substrates 11a, 12a in which the molding surfaces that form an optical surface of a lens are formed with the insert main bodies 11b, 12b, forming of the molding surfaces are facilitated, whereby the manufacturing steps can be reduced. As a result, the insert molds 11, 12 can be produced at a low cost.

It is known that ceramics such as silicon nitride and aluminum titanate can be used as heat-insulating materials. However, not only ceramics have defects that they are brittle and tend to suffer thermal shock fracture easily, but also a sophisticated technology and a cost are required to obtain a mirror surface. Taking productivity into consideration, it is not suitable in the present invention.

In view of molding conditions, it is preferred that the glass materials 11a, 12a formed of such amorphous glass material be formed in a thickness of 3 to 4 mm such that they can fully withstand injection pressure or retaining pressure at the time of injection molding. In order to prevent breakage not only at the time of injection molding but also during handling, the glass substrates can be surface-treated with reinforced glass or DLC (diamond-like carbon).

In order to connect such glass substrates 11a, 12a to the insert main bodies 11b, 12b, it is possible to use, as an adhesive, a thermosetting resin having a high coefficient of linear thermal expansion coefficient and excellent stability at high temperature environments. They may be connected by applying such adhesive to the connection surfaces of the insert main bodies 11b, 12b by means of a brush. As such thermosetting resin, a sulfur-containing thermosetting resin obtained by reacting a thermosetting monomer containing sulfur is preferable. A sulfur-containing thermosetting resin has a low linear thermal expansion coefficient, exhibits excellent stability even at high temperatures, and has excellent adhesiveness with a glass material. Further, in the monomer state before curing, it can be adhered to the surface in a liquid film state due to a low surface tension, whereby an adhesive layer formed between the glass substrates 11a, 12a and the insert main bodies 11b, 12b can be rendered a significant thin layer.

The sulfur-containing thermosetting resin is preferably at least one resin selected from a thio-urethane resin and an epithio-based resin. Here, a thio-urethane resin means a resin obtained by reacting a polyisocyanate compound and a polythiol compound, and an epithio-based resin means a resin obtained by reacting a lens raw material monomer containing an epithio group-containing compound as an essential component. In respect of significant excellent adhesion with a glass material and economy, it is particularly preferable to use a thio-urethane resin as the sulfur-containing thermosetting resin. As the commercially available thio-urethane resin, the MR series manufactured by sold by Mitsui Chemicals Inc. (available as "MR-6", "MR-7", "MR-8", "MR-10", "MR-20", "MR-1746" or the like) can preferably be used.

The insert main bodies 11b, 12b can be formed by using a steel material such as maraging steel and a beryllium-copper alloy. It is preferable to use a material having a higher thermal diffusivity as compared with the glass material used in the heat-insulating materials 11a, 12a.

In the mold 50 having the above-mentioned configuration, the mold main body 4 of the movable mold 1 is fixed to a movable die plate 64 through a mold attaching member 16, and the main body 8 of the fixed mold 2 is fixed to the fixed die plate 61 through a mold attaching member 15. Due to such a configuration, the mold 50 can be attached between the fixed die plate 61 and the movable die plate 64 of a clamping apparatus 60.

In the mold-attaching member 16 on the side of the movable mold 1, a hydraulic cylinder 19 is provided in correspondence with each of the insert molds 11. A piston rod 21 linked to a piston 20 is inserted through a back insert 22 fixed to one end side of the hydraulic cylinder 19. A T-shaped clamping member 23 that is provided at the front end of each of the piston rods 21 is detachably engaged with a T-shaped groove 24 formed on the back surface (the surface opposite to a surface on which the molding surface is formed) of the insert mold 11.

Due to such a configuration, in the state where the mold 50 is opened, the piston rod 21 in each hydraulic cylinders 19 is advanced, thereby to allow the T-shaped clamping member 23 provided at the front end of each of the piston rods 21 to be protruded from the insert guiding member 5. As a result, the insert mold 11 can be exchanged according to a plastic lens to be formed. When the piston rod 21 of each hydraulic cylinder 19 is retreated, the insert mold 11 attached to the T-shaped clamping member 23 is accommodated within the insert guiding member 5.

Similarly, in the mold-attaching member 15 on the side of the fixed mold 2, a hydraulic cylinder 26 is provided in correspondence with each of the insert molds 12. A piston rod 28 linked to a piston 27 is inserted to the mold-attaching member 15. A T-shaped clamping member 29 that is provided at the front end of each of the piston rods 28 is detachably engaged with a T-shaped groove 30 formed on the back surface (the surface opposite to a surface on which the molding surface is formed) of the insert mold 12.

Due to such a configuration, in the state where the mold 50 is opened, by the piston rod 28 in each hydraulic cylinder 26 is advanced, thereby to allow a T-shaped clamp member 29 provided at the front end of each piston rod 28 to protrude from the insert guiding member 9. As a result, the insert mold 12 can be exchanged in accordance with a plastic lens to be formed. If the piston rod 28 of each hydraulic cylinder 26 is retreated, the insert mold 12 attached to the T-shaped clamp member 29 is accommodated within the insert guiding member 9.

When the mold main body 4 of the movable mold 1 is fixed to the movable die plate 64, as shown in FIG. 3, the mold main body 4 is attached to a mold-attaching member 16 formed of a first member 16A and a second member 16B by a bolt 17. At this time, between the mold main body 4 of the movable mold 1 and the mold-attaching member 16, a plurality of disc springs 17A inserted in the outer periphery of the bolt 17 are interposed, whereby a gap S is formed between the mold main body 4 of the movable mold 1 and the mold-attaching member 16.

This gap S is closed in a way that, after the mold 50 is closed, the movable die plate 64 is further advanced, and the mold-attaching member 16 guided by a guide pin 18 is pressed against the elastic force of the disc spring 17A. With the closure of the gap, in the shown example, each hydraulic cylinder 19 provided in the mold-attaching member 16 presses the insert mold 11 through the back insert 22. As a result, the volume of the cavity 3 is changeable when clamping is conducted, and a molten resin that has been filled by injection to the cavity 3 can be compressed by the insert mold 11.

The guide pin 18 is protruded to the side of the fixed mold 2 so that it guides the opening and closing operation of the mold 50, and is inserted to an insertion hole formed in the fixed mold 2.

Further, on the other end of the hydraulic cylinder 19 provided in the mold-attaching member 16 on the side of the movable mold 1, a pressure-receiving member 32 is provided. When an eject rod 34 that has been inserted from a hole 33 formed in the mold-attaching member 16 presses the pressure-receiving member 32, the hydraulic cylinder 19, the back insert 22 and the insert mold 11 are also pressed, whereby a lens formed in the cavity 3 is pushed out.

In the middle of the mold-attaching member 16, an eject pin 35 is provided so as to advance or retreat in the direction parallel with the opening-closing direction of the mold 50. When the pressure-receiving member 36 that is attached to the eject pin 35 is pressed by an eject rod 38 that has been inserted from a hole 37 formed in the mold-attaching member 16, the eject pin 35 is pushed out.

Therefore, when opening the mold, a mold product can be taken out by advancing the eject rods 34, 38.

As shown in FIG. 4, in the pressure-receiving member 36, the spring force of a spring 42 that is wound around the outer circumference of an eject return pin 41 is acted in the left-side direction in the figure. Further, also not shown particularly, the pressure-receiving member 32 has the same configuration so that the spring power is acted in the left-side direction in the figure. As a result, when the eject rods 34, 38 are retreated, the pressure-receiving members 32 and 36 are retreated to their respective stand-by positions.

As shown in FIG. 4, the mold 50 has a nozzle-shut mechanism 90 that blocks a nozzle 85 of the injection apparatus 80. The nozzle-shut mechanism 90 has a nozzle-shut pin 91 as a blocking member that protrudes to the sprue 48 formed by the sprue bush 47. This nozzle-shut pin 91 is connected to a piston rod 94 of the hydraulic cylinder 93 through a connection piece 92. The hydraulic cylinder 93 is fixed to the mold-attaching member 15 by means of a cylinder mounting plate 95. Due to such a configuration, when the hydraulic cylinder 93 is driven in a state where the nozzle 85 is pressed against the sprue push 47, the nozzle-shut pin 91 is protruded in the sprue 48 to block the nozzle 85, whereby backflow of the resin is prevented.

[Method for Manufacturing a Plastic Lens]

Figure 8:
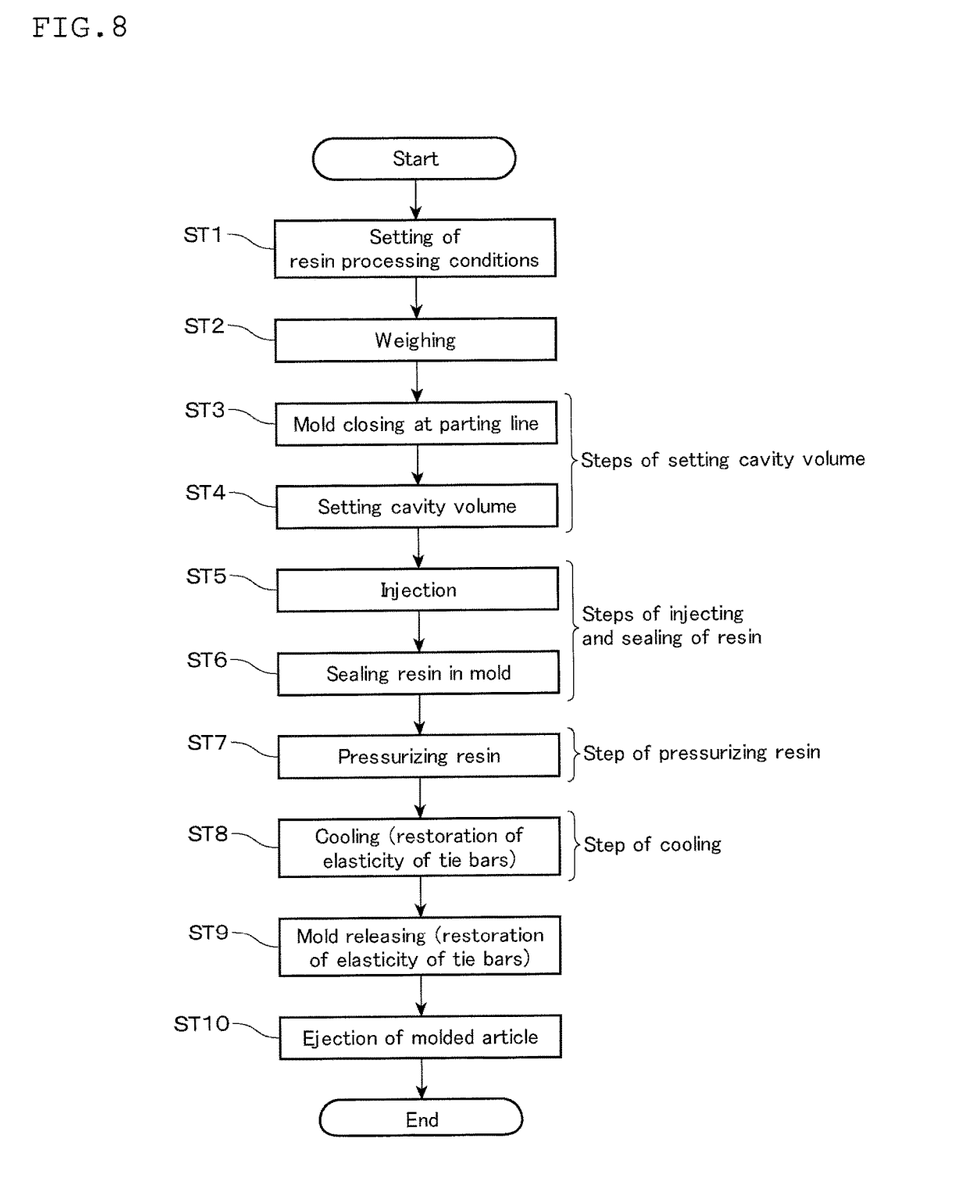
FIG. 8 is a flow chart showing each step in the embodiment of the method for manufacturing a plastic lens according to the present invention.

In order to manufacture a plastic lens by using the above-mentioned injection molding apparatus, each step (ST1 to ST10) of a flow chart shown in FIG. 8 is conducted in sequence.

In ST1, the resin pressurizing conditions are set. This is conducted in order to adjust the clamping force in accordance with the properties (shape, power, or the like of a lens) of a plastic lens to be molded so that an appropriate pressure is imparted to the resin in the cavity 3.

In ST2, weighing is conducted. In the injection apparatus 80, a pellet-like raw material resin input from the hopper 81 is, while being sheared and pulverized by a screw rotating in the heating cylinder 82 and being molten and kneaded by the shear heat and heat from a heater provided in the heating cylinder 82, sent to a cylinder front chamber formed between the front end of the screw and a nozzle 85, and weighed. Here, the amount of a molten resin that is required to be filled in the cavity 3, the runner 49 and the sprue 48 is measured.

As the raw material resin, a thermoplastic resin such as a polycarbonate resin and an acrylic resin that is commonly used for forming this type of a plastic lens can be used.

In ST3, the mold is closed at the parting line PL. Specifically, when a cross head 73 is advanced by driving the toggle linking mechanism 65, toggle links 71A, 71B are extended, and the movable die plate 64 is advanced towards the fixed die plate 61, whereby the mold 50 is closed. At this time, the gap S is kept in the state where the disc spring 17A interposed between the mold main body 4 of the movable mold 1 and the mold-attaching member 16 is not compressed, and the fixed mold 2 and the movable mold 1 are closed at the parting line PL. In this state, the gap S is set in the maximum opening amount.

In ST4, the cavity volume is set. In a state where the movable mold 1 and the fixed mold 2 are brought into close contact at the parting line PL in ST3, the crosshead 73 is further advanced to a position which is set in advance (cavity volume setting position). As a result, the toggle links 71A, 71B are extended, and the movable die plate 64 is moved towards the fixed die plate 61, and then moved to a position at which the cavity is enlarged. The enlarged amount of the cavity is determined by the position of the crosshead. As a result, the gap S of the mold 50 is reduced with an amount required for enlargement of the cavity being remained. At this time, the volume of the cavity 3 (wall thickness) is enlarged such that it becomes larger than the volume of a lens (wall thickness) to be molded. Since the disc spring 17A is compressed, as the force counter to the compression, some clamping power is generated.

In ST5, injection is conducted. A molten resin that is weighed in ST2 is injected to the mold 50 through a passage of the injection nozzle 85. That is, the weighed molten resin that has been introduced to the heating cylinder 82 of the injection apparatus 80 is injected. As a result, the molten resin is injected from the nozzle 85 formed at the front end of the heating cylinder 82, and is filled in the cavity 3 through the sprue 48, the runner 49 and the gate G. When the molten resin is filled in the cavity 3, the injection speed is controlled at a fixed speed.

In ST6, the resin is sealed in the mold. After injecting a prescribed amount of the resin in ST5, immediately before the completion of injection and filling of the molten resin, the crosshead 73 is further advanced. After completion of injection and filling, the nozzle shut pin 91 is immediately allowed to protrude in the sprue 48 by the nozzle shut mechanism 90, whereby the nozzle 85 is blocked. As a result, the molten resin that has been filled can be sealed within the mold 50 in the compressed state.

In ST7, pressurization of the resin is conducted. In ST6, the advancement of the crosshead 73 is started, and when the crosshead 73 is advanced to the original point (0 position) and is stopped, since the toggle links 71A, 71B have finished extending, the molded resin sealed within the mold 50 is compressed.

In ST8, cooling is conducted. In this cooling, temperature control of a temperature control fluid is conducted by a mold temperature control apparatus such that the temperature of each part (insert mold, insert guiding means or the like) of the mold 50 becomes a preset temperature that is equal to or lower than the glass transition temperature of the raw material resin in accordance with the properties of a lens to be molded. If the molten resin sealed in the mold 50 is cooled in the compressed state, the raw material resin that has been injected and filled in the cavity 3 is solidified and shrunk as cooling proceeds in the compressed state, whereby a plastic lens having a prescribed volume can be molded.

In ST9, mold-releasing is conducted. In the mold releasing, the crosshead 73 in the toggle linking mechanism 65 is retreated towards the rear plate 62, whereby the opening of the mold 50 is conducted.

In ST10, ejection of a molded product is conducted. If the crosshead 73 is retreated to the end, the distance between the movable die plate 64 and the fixed die plate 61 becomes maximum, and the mold 50 is opened by dividing along the parting line PL. During this mold opening, the eject rods 34, 38 are advanced, a molded plastic lens is taken out.

In manufacturing a plastic lens by the above-mentioned procedure, In ST5, when the molten resin is injected and filled in the cavity 3, if the temperature of the mold is set low in order to shorten the molding cycle, there is a concern that the transferability is lowered.

In this embodiment, in order to prevent lowering in transferability by preventing lowering in viscosity of the resin that flows the surface of the cavity 3 even if the temperature of the mold is set low when the molten resin is injected and filled in the cavity 3, each of the molding surface of the insert mold 11 on the side of the movable mold 1 side and the molding surface of the insert mold 12 on the side of the fixed mold 2, that form the cavity 3, is formed in the glass substrates 11a and 12a as heat-insulating materials that are made of a glass material. Then, by controlling the temperature of the temperature control fluid by the mold temperature control apparatus, the surface temperature of the molding surface of the insert molds 11, 12 is controlled such that it does not exceed the glass transition temperature of the raw material resin, whereby the time required for cooling is shortened, and productivity can be enhanced.

When the molten resin injected and filled in the cavity 3 is brought into contact with the molding surface of the mold, the temperature of the surface layer part of the resin is lowered by the heat diffusion of the mold. On the other hand, the surface temperature of the molded surface is increased. Since the thermal diffusivity of a glass material is significantly lower than that of a metal mold that is commonly used, during a period of time for which filling is completed with the cavity 3 being filled with the molten resin, the temperature of the surface layer part of the molten resin is kept at a temperature that is equal to or higher than the glass transition temperature, thereby to delay generation of a solidified layer.

In order to obtain good transferability, it is desirable that the molten resin be pressurized in a state where the temperature of the surface layer part of the molten resin is equal to or higher than the glass transition temperature. If the temperature at this time is too high, the time required for cooling becomes long, whereby productivity is lowered. In particular, in the case of a thick lens, since the cooling time accounts for almost all of the molding cycle. By further lowering the temperature of the mold, the time required for cooling can be shortened.

However, when the temperature of the mold is lowered, transferability is lowered. Therefore, lowering in temperature of the mold has its limit. In this embodiment, by utilizing the heat-insulating effect of a glass material, within a range that the temperature of the surface layer part of the molten resin at the time of filling can be maintained at a temperature that is equal to or higher than the glass transition temperature, the temperature of the molding surface of the insert molds 11, 12 formed in the glass substrates 11a, 12a can be set to a lower temperature as compared with a conventional metal mold.

In shortening the cooling time while keeping transferability, in the glass substrates 11a, 12a that form each of the molding surfaces of the insert molds 11 and 12, it is preferable to use a glass material that has a thermal conductivity of 0.4 to 1.3 W/m·K. If the thermal conductivity exceeds the above-mentioned range, there is a tendency that a sufficient heat insulating effect cannot be obtained easily. On the other hand, if the thermal conductivity is smaller than the above-mentioned range, heat insulating effect is excessively enhanced, whereby the time required for cooling is prolonged.

Figure 9:
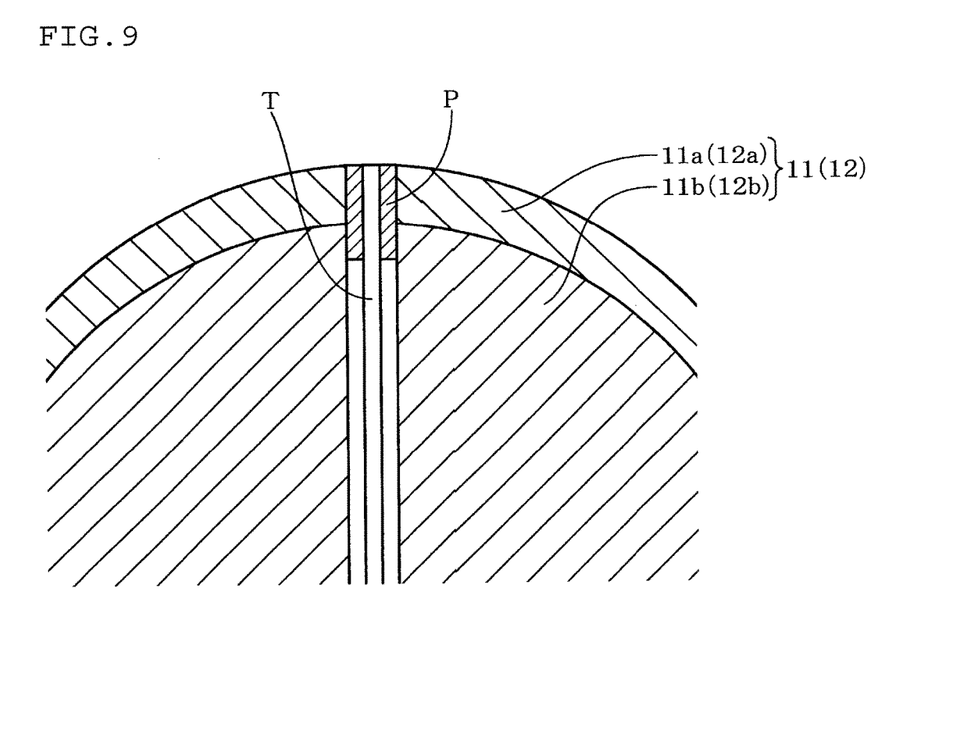
FIG. 9 is an explanatory view showing one example of the method for measuring the surface temperature of a molding surface.

As shown in FIG. 9, for example, the surface temperature of the molding surface can be measured by a method in which a thermocouple T is arranged within a hole that opens in the molding surface of the insert molds 11, 12 (glass substrates 11a, 12a), opening of the hole is filled with a metal putty P, and the temperature-measuring part of the thermocouple T is fixed so that it is positioned in the vicinity of the molding surface.

In this embodiment, the molding surfaces of the insert molds 11, 12 are formed in the glass substrates 11a, 12a, whereby lowering in temperature of the molded resin flowing into the cavity 3 can be suppressed. In addition, in order to shorten the cooling time after the molding by accelerating radiation of heat from the insert main bodies 11b, 12b, it is preferable to form the insert main bodies by using a steel material having a higher thermal diffusivity than that of the glass material used in the glass substrates 11a, 12a.

Further, even after completion of filling of the raw material resin in the cavity 3, if the temperature of the surface layer part of the raw material resin is still equal to or higher than the glass transition temperature, shortening of the molding cycle is hindered. Therefore, at the timing when filling is completed with the cavity 3 being filled with the raw material resin, it is preferable to conduct injection molding while appropriately adjusting various molding conditions such that the temperature of the surface layer part of the raw material resin becomes lower than the glass transition temperature thereof.

In this embodiment, in ST7, the movable die plate 64 is further advanced, each of hydraulic cylinders 19 attached to the mold-attaching member 16 presses the insert mold 11 through the back insert 22, the insert mold 11 moves slidably in the insert guiding member 5, and compresses the molten resin filled by injection in the cavity 3. In ST10, the pressure-receiving member 32, the hydraulic cylinder 19, the back insert 22 and the insert mold 11 are pressed by the eject rod 34, and the insert mold 11 moves slidably in the insert guiding member 5, thereby to push out a lens formed in the cavity 3.

In this way, the insert mold 11 on the side of the movable mold 1 repeatedly moves slidably within the insert guiding member 5 after being accommodated within the insert guiding member 5 for each molding shot. However, in the insert mold 11 manufactured by the above-mentioned method, the outer peripheral surface of the glass substrate 11a is positioned inside of the outer peripheral surface of the insert main body 11b at a fixed interval "d" along its outer peripheral surface direction. Therefore, when it moves slidably within the insert guiding member 5, even if the insert mold 11 is inclined relative to the axial direction, contact of the outer peripheral surface of the glass substrate 11a with the inner peripheral surface of the insert guide member 5 can be effectively prevented.

Therefore, not only in the insert mold 12 on the side of the fixed mold 2, also in the insert mold 11 on the side of the movable mold 1, a mold for forming an optical lens obtained by connecting the glass substrate 11a in which a molding surface for forming an optical surface of a lens is formed with the insert main body 11b can be used without problems.

Accordingly, by forming each molding surface of the insert molds 11 and 12 in the glass substrates 11a and 12a, even if the mold temperature at the time of injection molding is set low in order to shorten the molding cycle, due to heat-insulating effects of the glass substrates 11a and 12a, lowering in temperature of the molten resin that flows into the cavity 3 can be prevented. Therefore, productivity can be enhanced by shortening the cooling time by setting the mold temperature to low while preventing occurrence of defects in external appearance due to lowering in viscosity of the molten resin while flowing. Such an advantageous effect is more significantly exhibited by using, in both of the insert mold 11 on the side of the movable mold 1 and the insert mold 12 on the side of the movable mold 2, a mold for forming an optical lens obtained by connecting the glass substrate 11a in which the molding surface for forming an optical surface of a lens is formed with the insert main body 11b.

EXAMPLES

The present invention will be explained in more detail in accordance with specific examples.

Example 1

In the mold injecting apparatus shown in FIG. 1, the molding surface of the insert mold 11 on the side of the movable mold 1 and the molding surface of the insert mold 12 on the side of the fixed mold 2 were formed in glass substrates 11a, 12a, respectively. They were made of a Crown-based glass material as a heat-insulating material having a thermal conductivity of 1.1 W/m·K. By this injected molding apparatus, a plastic lens having a thickness at the middle of 10 mm, a thickness at the peripheral edge of 12 mm and a radius of 77 mm were formed by using polycarbonate as a raw material resin under the following conditions.

Temperature of resin: 290° C.

Temperature of the molding surfaces of the insert molds 11, 12: initially 55° C. and controlled below the glass-transition temperature of polycarbonate used as a raw material resin (Tg: 145° C.)

Cooling time (the period of time spent in ST8 mentioned above): standard value, standard value minus 30 s, standard value minus 60 s, or standard value minus 90 s The level of optical power in the middle of the formed plastic lens was measured. The transfer properties were evaluated based on whether the level obtained was within the tolerance of the intended level (D: −3.3) or not. The case where the level was within the tolerance is indicated by "◦", and the case where the level was not within the tolerance is indicated by "x". The results are shown together in Table 1.

Example 2

A similar plastic lens was formed under the same molding conditions as in Example 1, except that the temperature of the molding surfaces of the insert molds 11 and 12 was set to be 85° C.

The level of optical power in the middle of the formed plastic lens was measured, thereby to evaluate the transfer properties in the same manner as in Example 1. The results are shown together in Table 1.

Comparative Example

A similar plastic lens was formed under the same molding conditions as in Example 1, except that both of the insert mold 11 on the side of the movable mold 1 and the insert mold 12 on the side of the fixed plate 2 were formed by using maraging steel, the temperature of the molding surfaces was initially set to be 130° C. and was allowed to exceed the glass transition temperature of polycarbonate used as a raw material resin.

The level of optical power in the middle of the formed plastic lens was measured to evaluate the transfer properties in the same manner as in Example 1. The results are shown together in Table 1.

TABLE 1

| | Resin temperature [° C.] | Temperature of molding surface [° C.] | Intended level | Standard value | Cooling time −30 S | −60 S | −90 S |
|---|---|---|---|---|---|---|---|
| Example 1 | 290 | 55 | −3.3 | ○ | ○ | ○ | x |
| Example 2 | 290 | 85 | −3.3 | ○ | ○ | x | x |
| Com. Ex. | 290 | 130 | −3.3 | ○ | x | x | x |

From these results, it was confirmed that the cooling time could be shortened without deteriorating the transfer properties even if the temperature of the molding surface was lowered as compared to Comparative Example (130° C.) as seen in Example 2 (85° C.) and Example 1 (55° C.).

Hereinabove, the present invention is explained in accordance with preferable embodiment. The present invention is not limited to the above-mentioned embodiment, and it is needless to say that various modifications are possible within the scope of the present invention.

For example, as the method for forming a plastic lens for eye glasses, a method is known in which a lens is formed in a semi-finished state in which the thickness thereof is larger than that of the finished size, and the semi-finished product called as the "semi-finished lens" is finished into a final product in the post processing. Specifically, in this method, a plurality of semi-finished lenses are prepared in which the convex sides are formed in different optical surface shapes, and the concave sides are formed in the common concave surface are prepared. Among them, a lens appropriate for a user's prescription is selected, and the concave side is cut and polished in accordance with the prescription to allow it to be in a final form.

When such a semi-finished lens is formed by an injection molding method, transferability of the surface to which a post processing is conducted is not required to be taken into consideration. Therefore, when a semi-finished lens is manufactured, in at least one of molds of a pair of halved molds forming the cavity (a mold for forming a surface for which no cutting or polishing is conducted in the post-processing), the molding surface may be formed of a heat-insulating material made of a glass material.

The present invention can be applied irrespective of the thickness of a plastic lens to be formed. In particular, in the case of a plastic lens having a significantly small product thickness, since a resin tends to be solidified during injection, and hence, it is formed by ultra-high speed injection molding or high-temperature molding. By applying the present invention, since solidification of the resin during injection can be delayed, molding can be conducted easily.

Further, when a significantly fine pattern is formed on the optical surface, the pattern cannot be fully transferred because of solidification during injection. In such a case, normally, molding is conducted by high-temperature molding. By applying the present invention, since solidification of the resin during injection can be delayed, molding can be conducted easily.

INDUSTRIAL APPLICABILITY

The present invention can be utilized as a technology that can enhance productivity by shortening the time required for cooling without lowering transferability when a plastic lens is produced by injection molding.

DESCRIPTION OF SYMBOLS

1. Movable mold (halved)
2. Fixed mold (halved)
3. Cavity
11, 12. Insert mold
11a, 12a Glass substrate
11b, 12b Insert main body
50. Mold
100. Assembly jig
101. Metal tape (filling material)

The invention claimed is:

1. A method for manufacturing a plastic lens in which a molten raw material resin is injected and filled in a cavity between a pair of halved molds, thereby forming a plastic lens having a prescribed lens shape, comprising the steps of
   obtaining a mold for forming an optical lens in which a glass substrate forming a molding surface for forming the cavity is connected with a metal pedestal by:
   forming the glass substrate to have a radius smaller than that of the pedestal,
   arranging an assembly jig on the outer peripheral surface of the pedestal such that it is in close contact therewith, and
   stacking the glass substrate on the pedestal and connecting them with a filling material that is formed to have a thickness corresponding to the difference in radius between the glass substrate and the pedestal being disposed between the assembly jig and the glass substrate;
   using the mold for forming an optical lens in at least one of the pair of halved molds; and
   injecting and filling the raw material resin in the cavity to mold a prescribed lens shape.

2. The method for manufacturing the plastic lens according to claim 1, wherein:
   for a period of time from start of flowing of the raw material resin into the cavity to completion of filling with the cavity being filled with the raw material resin, temperature control is conducted such that the surface temperature of the molding surface does not exceed the glass transition temperature of the raw material resin.

3. The method for manufacturing the plastic lens according to claim 2, wherein, for a period of time from start of flowing of the raw material resin into the cavity to completion of filling with the cavity being filled with the raw material resin, the temperature of a surface layer part of the raw material resin is kept at a temperature that is equal to or higher than the glass transition temperature.

4. The method for manufacturing the plastic lens according to claim 3, wherein at the timing when filling is completed with the cavity being filled with the raw material resin, the temperature of the surface layer part of the raw material resin is lower than the glass transition temperature.

5. The method for manufacturing the plastic lens according to claim 1, wherein the molding surface is formed by using, as the glass substrate, an amorphous glass material having a thermal conductivity of 0.4 to 1.3 W/m·K.

6. A method for manufacturing a mold for forming an optical lens that is obtained by connecting a glass substrate in which a molding surface for molding a plastic lens having a prescribed lens shape is formed with a metal pedestal, comprising:

forming the glass substrate to have a radius smaller than that of the pedestal;

arranging an assembly jig on the outer peripheral surface of the pedestal such that it is in close contact therewith; and stacking the glass substrate on the pedestal and connecting them with a filling material that is formed to have a thickness corresponding to the difference in radius between the glass substrate and the pedestal being disposed between the assembly jig and the glass substrate.

7. The method for manufacturing the mold for forming the optical lens according to claim 6, wherein the difference in radius between the glass substrate and the pedestal is 5 to 50 µm.

8. The method for manufacturing the mold for forming the optical lens according to claim 6, wherein three or more of assembly jigs are arranged at an equal interval along the outer peripheral surface of the pedestal.

9. The method for manufacturing the mold for forming the optical lens according to claim 6, wherein the filling material is a metal tape.

* * * * *